United States Patent Office 2,728,769
Patented Dec. 27, 1955

2,728,769

ALKOXYBENZYLISOQUINOLINES AND SALTS THEREOF

Edwin R. Shepard, Indianapolis, Ind., assignor to Eli Lilly and Company, Indianapolis, Ind., a corporation of Indiana No Drawing. Application August 17, 1954,
Serial No. 450,553

9 Claims. (Cl. 260—286)

This is a continuation-in-part of my copending U. S. patent application Serial No. 327,151, filed December 20, 1952, which was a continuation-in-part of my prior U. S. patent applications Serial Nos. 126,441 and 126,442, filed November 9, 1949, now abandoned.

This invention relates to novel organic compounds and more particularly to alkoxybenzylisoquinoline bases and their salts.

The bases of the present invention can be represented by the following formula:

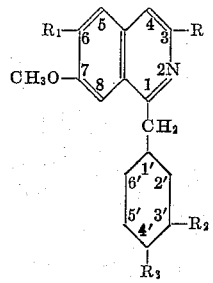

in which R is hydrogen or methyl, $R_1$ is methoxy or ethoxy and is methoxy when R is methyl, $R_2$ and $R_3$ are different alkoxy radicals having from 1 to 3 carbon atoms, only one of the radicals having 1 carbon atom, and $R_2$ and $R_3$ further having from 1 to 2 carbon atoms when R is hydrogen.

Illustrative examples of the bases of the compounds which come within the scope of this invention are the following: 6,7-dimethoxy-3-methyl-1-(3'-isopropoxy-4'-methoxybenzyl)-isoquinolines; 6,7-dimethoxy-3-methyl-1-(3' - n - propoxy - 4' - methoxybenzyl)-isoquinoline; 6,7-dimethoxy-3-methyl-1 - (3'-methoxy-4'-isopropoxybenzyl)-isoquinoline; 6,7-dimethoxy-3-methyl-1-(3' - ethoxy - 4'-methoxybenzyl)-isoquinoline; 6,7-dimethoxy-3-methyl-1-(3'-n-propoxy-4'-methoxybenzyl)-isoquinoline, and 6,7-dimethoxy-3-methyl-1-(3'-methoxy-4'-ethoxybenzyl)-isoquinoline.

The new alkoxybenzylisoquinoline bases are white crystalline substances which are only slightly soluble in water but are quite soluble in the common organic solvents such as ether, ethyl acetate, etc. By virtue of the nitrogen atom in the isoquinoline nucleus, the bases form acid addition salts, these salts being, in general, crystalline compounds having a greater solubility in water and a lesser solubility in organic solvents than the isoquinoline bases.

The novel bases and salts of this invention and the dihydroisoquinolines and salts thereof used as intermediates for preparing said compounds have desirable properties which render them capable of therapeutic use as antispasmodics and coronary vasodilators.

Broadly speaking, those compounds of the present invention which do not contain a 3-methyl substituent are prepared in the following manner. An alkoxyphenethylamine is reacted with a suitable alkoxyphenylacetic acid to form the corresponding alkoxyphenylacetyl derivative of the alkoxyphenethylamine. This compound is treated with phosphorus oxychloride in an inert solvent solution to form, by ring closure, an intermediate alkoxylbenzyldihydroisoquinoline. The dihydroisoquinoline base, if desired, is isolated and purified, or is dehydrogenated with palladium to form the desired alkoxybenzylisoquinoline. The following series of formulas illustrates the course of the reactions. In the formulas given below, R, $R_1$ and $R_2$ have the same significance as hereinabove.

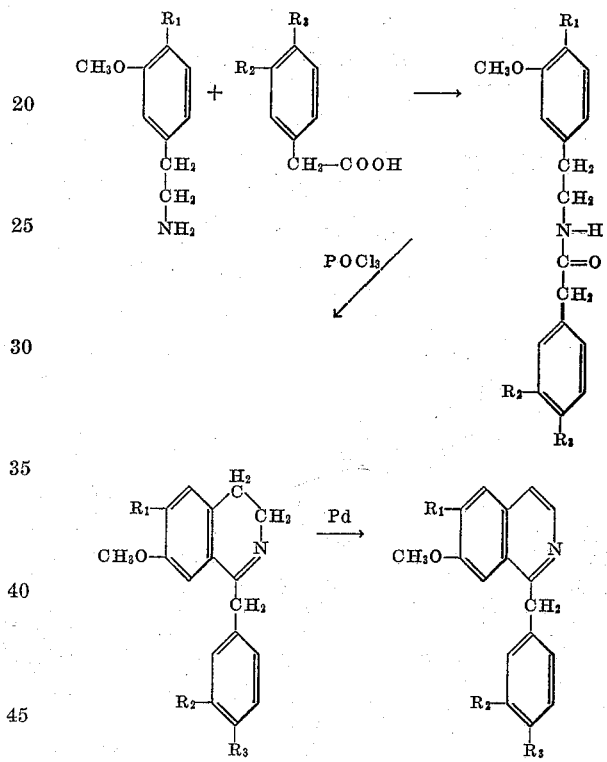

Those compounds of the present invention which do contain 3-methyl substituents are prepared in the following manner. α-Methylhomoveratrylamine is prepared by methods known to the art, as by the action of hydrogen bromide on eugenol methyl ether, followed by treatment with ammonia in an autoclave, or by catalytically hydrogenating 1-(3',4'-dimethoxyphenyl - 2 - propanone oxime. The amine is reacted with a phenylacetic acid appropriately substituted with $R_3$ and $R_2$ radicals (these having the same significance as hereinabove) to form the corresponding α-methylhomoveratryl alkoxyphenylacetamide. This compound is treated with phosphorus oxychloride in an inert solvent solution to form, by ring closure, an alkoxybenzyldihydroisoquinoline; which, if desired, is isolated and purified, or is dehydrogenated with palladium to form the desired alkoxybenzylisoquinoline. The following equations illustrate the course of the reaction with specific reference to the preparation of 6,7-dimethoxy-3-methyl-1-(3′-methoxy-4′-ethoxybenzyl)-isoquinoline.

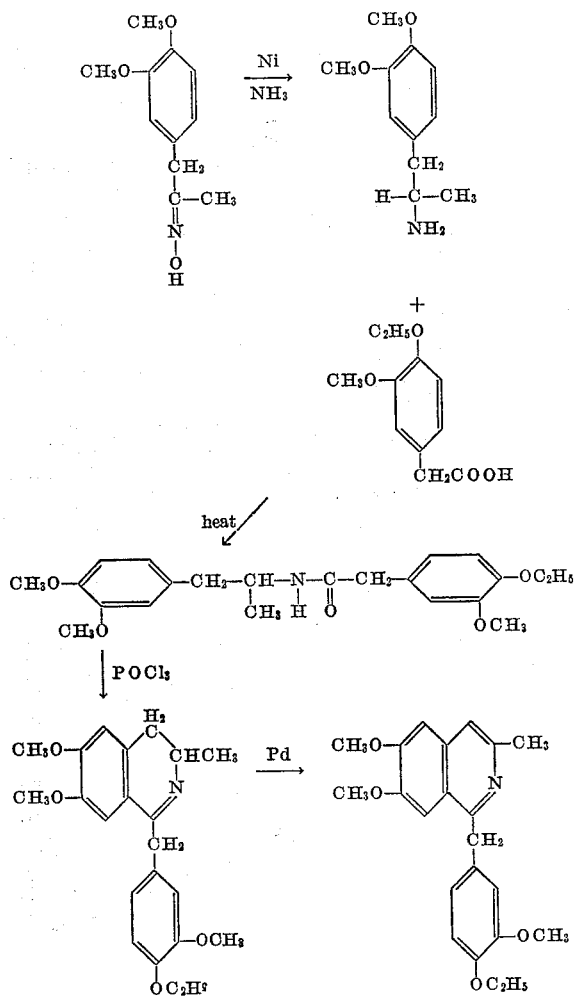

The acid addition salts of the novel isoquinoline and dihydroisoquinoline bases of this invention are prepared by methods commonly employed for the preparation of organic base salts, for example, by neutralization and metathetical reactions. Suitable acid addition salts of the isoquinoline and dihydroisoquinoline bases of this invention include their nontoxic inorganic and organic salts such as the sulfate, phosphate, hydrochloride, hydriodide, nitrate, hydrobromide, acetate, maleate, citrate and fumarate salts, and the like.

This invention is further illustrated by the following specific examples giving detailed methods of preparing the novel alkoxybenzylisoquinolines and alkoxybenzyldihydroisoquinolines, and representative acid addition salts of these bases.

*Example 1*

6,7-dimethoxy-1-(3′-methoxy - 4′ - ethoxybenzyl) - isoquinoline.

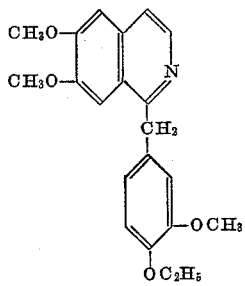

860 parts of decalin are charged into a suitable reaction vessel equipped with a stirrer and water-cooled return condenser. 700 parts of 3,4-dimethoxyphenethylamine (homoveratrylamine) are then added and the resulting mixture is heated with stirring to 155–165° C. Thereafter 812 parts of 3-methoxy-4-ethoxyphenylacetic acid are added over a thirty-minute period. The resulting mixture is heated at its boiling point (180° C.) for about forty-five minutes and then cooled.

After cooling the reaction mixture, the decalin is stripped off by heating the mixture at a pressure of about 30 mm. of mercury to a maximum pot temperature of 150° C. The product is held under these conditions for fifteen minutes and then cooled.

After recrystallization of the residue from a dilute aqueous ethanol solution, N-(3-methoxy-4-ethoxyphenylacetyl)-3′,4′-dimethoxyphenethylamine is obtained in a yield of about 80 percent. The product has a melting point of 123.6–124.1° C.

A solution of N-(3-methoxy-4-ethoxyphenylacetyl)-3′,4′-dimethoxyphenethylamine in 200 ml. of benzene is treated with 8 ml. of phosphorus oxychloride. The mixture is refluxed for about three hours, is cooled, and is shaken with a solution of 15 g. of sodium hydroxide in 60 ml. of water. The aqueous layer is removed and the benzene solution containing 6,7-dimethoxy-1-(3′-methoxy-4′-ethoxybenzyl)-dihydroisoquinoline is washed with water. The benzene solution is distilled to remove azeotropically the small amount of water remaining in the solution and 150 ml. of decalin are added and the mixture distilled until the temperature reaches about 180° C. 1.5 g. of 5 percent palladium on carbon are added and heating of the mixture is continued for six hours to dehydrogenate the dihydroisoquinoline compound. The reaction mixture is cooled and diluted with petroleum ether, and the 6,7-dimethoxy-1-(3′ - methoxy-4′-ethoxybenzyl)-isoquinoline is filtered off. Recrystallization of the isoquinoline compound from dilute ethanol yielded a product melting at about 130–130.5° C.

Analysis of the 6,7-dimethoxy-1-(3′-methoxy-4′-ethoxybenzyl)-isoquinoline thus prepared showed the presence of 71.23 percent carbon and 6.60 percent hydrogen, as compared with the calculated values of 71.36 percent carbon and 6.55 percent hydrogen.

*Example 2*

6,7 - dimethoxy-1-(3′ - methoxy-4′-ethoxybenzyl) - isoquinoline hydrochloride is obtained by treating a solution of 31.7 g. of 6,7-dimethoxy-1-(3′-methoxy-4′-ethoxybenzyl)-isoquinoline base in a mixture of 100 ml. of ethanol and 300 ml. of ether with a slight excess of concentrated hydrochloric acid. The solution is diluted with 300 ml. of ether, whereupon an oily precipitate comprising, 6,7-dimethoxy-1-(3′-methoxy-4′-ethoxybenzyl)-isoquinoline hydrochloride is formed. Upon standing, the oil gradually solidifies. The solid precipitate is filtered off, washed with ether, and redissolved in a mixture of 100 ml. of absolute ethanol and 300 ml. of acetone. The solution is filtered and anhydrous ether is added until crystals begin to separate. The mixture is then chilled and ether is added until precipitation is completed. The crystalline precipitate comprising 6,7-dimethoxy-1-(3′-methoxy-4′-ethoxybenzyl)-isoquinoline hydrochloride, is filtered off, washed with anhydrous ether and dried.

6,7-dimethoxy-(3′-methoxy-4′-ethoxybenzyl) - isoquinoline hydrochloride thus prepared melted at 182–184° C. Analysis showed the presence of 64.44 percent carbon and 6.47 percent hydrogen compared with the calculated quantity of 64.69 percent carbon and 6.20 percent hydrogen.

By using the above-described process other acid addition salts of 6,7-dimethoxy-1-(3′-methoxy-4′-ethoxybenzyl)-isoquinoline can be obtained. Thus, for example, in place of hydrochloric acid used in this example there may be used sulfuric, phosphoric, hydrobromic, maleic,

Example 3

6,7 - dimethoxy - 1 - (3' - ethoxy - 4' - methoxybenzyl)-isoquinoline.

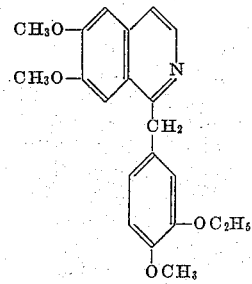

860 parts of decalin are charged into a suitable reaction vessel equipped with a stirrer and water-cooled return condenser. 700 parts of 3,4-dimethoxyphenethylamine (homoveratrylamine) are then added and the resulting mixture is heated with stirring to 155–165° C. Thereafter 812 parts of 3-ethoxy-4-methoxyphenylacetic acid are added over a thirty-minute period. The resulting mixture is heated at its boiling point (180° C.) for about forty-five minutes and then cooled.

After cooling the reaction mixture, the decalin is stripped by heating under a vacuum of about 30 mm. of mercury to a maximum pot temperature of 150° C. The product is held under these conditions for fifteen minutes and then cooled.

After recrystallization from a dilute aqueous solution of ethanol, N-(3-ethoxy-4-methoxyphenylacetyl)-3',4'-dimethoxyphenethylamine is obtained in a yield of about 80 percent. The product has a melting point of 99.6–100.6° C.

N - (3 - ethoxy - 4 - methoxyphenylacetyl) - 3',4'-dimethoxyphenethylamine is converted into 6,7-dimethoxy - 1 - (3' - ethoxy - 4' - methoxybenzyl) - dihydroisoquinoline, and the dihydroisoquinoline is dehydrogenated to 6,7 - dimethoxy - 1 - (3' - ethoxy - 4' - methoxybenzyl)-isoquinoline by the procedure described in Example 1.

6,7 - dimethoxy - 1 - (3' - ethoxy - 4' - methoxybenzyl)-isoquinoline thus prepared melted at 130–131° C. Analysis showed the presence of 71.28 percent carbon and 6.64 percent hydrogen as compared with the calculated amounts of 71.36 percent carbon and 6.55 percent hydrogen.

Example 4

6,7 - dimethoxy - 1 - (3' - ethoxy - 4' - methoxybenzyl)-isoquinoline hydrochloride is obtained by treating a solution of 25 g. of 6,7-dimethoxy-(3'-ethoxy-4'-methoxybenzyl)-isoquinoline base in 100 ml. of anhydrous ethanol with 5 g. of dry hydrogen chloride. The reaction mixture is diluted with sufficient anhydrous ether to cause complete precipitation. The precipitate, comprising 6,7-dimethoxy-(3'-ethoxy-4'-methoxybenzyl)-isoquinoline hydrochloride, is filtered off and recrystallized from absolute ethanol containing a trace of water, by the addition of anhydrous ether.

6,7 - dimethoxy - 1 - (3' - ethoxy - 4' - methoxybenzyl)-isoquinoline hydrochloride thus prepared melted at 191.5–198.0° C. Analysis showed the presence of 3.25 percent nitrogen as compared with the calculated amount of 3.59 percent nitrogen.

In addition to the hydrochloric acid addition salt described in this example, the acids listed in Example 2 and other similar acids can be used in preparing acid addition salts.

fumaric and acetic acids to give the corresponding acid addition salts.

Example 5

6 - ethoxy - 7 - methoxy - 1 - (3' - methoxy - 4' - ethoxybenzyl)-isoquinoline.

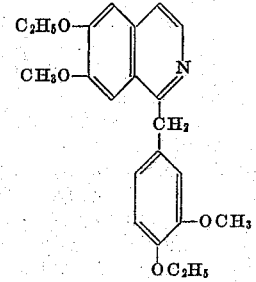

N - (3 - methoxy - 4 - ethoxyphenylacetyl) - 3' - ethoxy-4'-methoxyphenethylamine is obtained by reacting 756 parts of 3-ethoxy-4-methoxyphenethylamine and 812 parts of 3-methoxy-4-ethoxyphenylacetic acid in 900 parts of decalin according to the procedure described in Example 1.

N - (3 - methoxy - 4 - ethoxyphenylacetyl) - 3' - ethoxy-4'-methoxyphenethylamine is obtained in a yield of about 80 percent. The product after recrystallization from dilute aqueous ethanol melts at about 135–136° C.

N - (3 - methoxy - 4 - ethoxyphenylacetyl) - 3' - ethoxy-4'-methoxyphenethylamine is converted into 6-ethoxy - 7 - methoxy - 1 - (3' - methoxy - 4' - ethoxybenzyl)-dihydroisoquinoline, and the dihydroisoquinoline is dehydrogenated to 6-ethoxy-7-methoxy-1-(3'-methoxy-4'-ethoxybenzyl)-isoquinoline by the procedure described in Example 1.

6 - ethoxy - 7 - methoxy - 1 - (3' - methoxy - 4' - ethoxybenzyl)-isoquinoline thus prepared melted at about 125–126° C. Analysis showed the presence of 71.77 percent carbon and 6.83 percent hydrogen as compared with the calculated value of 71.91 percent carbon and 6.85 percent hydrogen.

Example 6

6 - ethoxy - 7 - methoxy - 1 - (3' - methoxy - 4' - ethoxybenzyl)-isoquinoline hydrochloride is prepared from the isoquinoline base of Example 5 and hydrochloric acid according to the procedure described in Example 2. 6 - ethoxy - 7 - methoxy - 1 - (3' - methoxy - 4' - ethoxybenzyl)-isoquinoline hydrochloride melted at about 198–202° C. Analysis showed the presence of 3.31 percent nitrogen as compared with the calculated value of 3.47 percent nitrogen.

6 - ethoxy - 7 - methoxy - 1 - (3' - methoxy - 4' - ethoxybenzyl)-isoquinoline phosphate is obtained by the same procedure employed for the preparation of the hydrochloride salt.

Example 7

6 - ethoxy - 7 - methoxy - 1 - (3' - methoxy - 4' - ethoxybenzyl)-isoquinoline acetate is obtained by treating the cold isoquinoline base with a slight excess of acetic acid and evaporating the excess acetic acid in vacuo. The acetate salt crystallizes slowly.

Example 8

6 - ethoxy - 7 - methoxy - 1 - (3' - ethoxy - 4' - methoxybenzyl)-isoquinoline.

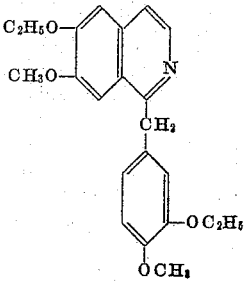

N - (3 - ethoxy - 4 -methoxy phenylacetyl) - 3' - ethoxy-4'-methoxyphenethylamine is obtained by reacting 756 parts of 3-ethoxy-4-methoxyphenethylamine and 812 parts of 3-ethoxy-4-methoxyphenylacetic acid in 900 parts of decalin according to the procedure described in Example 1.

N - (3 - ethoxy - 4 - methoxyphenylacetyl) - 3' - ethoxy-4'-methoxyphenethylamine is obtained in a yield of about 80 percent. After recrystallization from dilute ethanol, it melts at about 111.5–112.5° C.

N - (3 - ethoxy - 4 - methoxyphenylacetyl) - 3' - ethoxy-4'-methoxyphenethylamine is converted into 6-ethoxy-7 - methoxy - 1 - (3' - ethoxy - 4' - methoxybenzyl)-dihydroisoquinoline, and the dihydroisoquinoline is dehydrogenated to 6-ethoxy-7-methoxy-1-(3'-ethoxy-4'-methoxybenzyl)-isoquinoline by the procedure described in Example 1.

6 - ethoxy - 7 - methoxy - 1 - (3' - ethoxy - 4' - methoxybenzyl)-isoquinoline thus prepared melted at about 136° C. Analysis showed the presence of 71.80 percent carbon and 6.98 percent hydrogen as compared with the calculated values of 71.91 percent carbon and 6.85 percent hydrogen.

*Example 9*

6 - ethoxy - 7 - methoxy - 1 - (3' - ethoxy - 4' - methoxybenzyl)-isoquinoline hydrochloride is prepared from the isoquinoline base of Example 8 and hydrochloric acid according to the procedure described in Example 2. 6-ethoxy-7-methoxy-1-(3'-ethoxy-4'-methoxybenzyl)-isoquinoline hydrochloride melted at about 168° C. Analysis showed the presence of 3.35 percent nitrogen as compared with the calculated value of 3.47 percent nitrogen.

*Example 10*

Preparation of 6,7-dimethoxy-3-methyl-1-(3'-methoxy-4'-ethoxybenzyl)-dihydroisoquinoline hydrochloride.

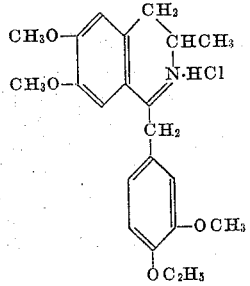

A mixture of 150 g. of 1-(3',4'-dimethoxyphenyl)-2-propanone and 70 g. of hydroxylamine hydrochloride in 125 cc. of water is stirred while a solution of 51.3 g. of sodium carbonate in 150 cc. of water is added over the course of fifteen minutes, and while maintaining the reaction mixture at 30–40° C. The reaction mixture is stirred for an additional two-and-one-half-hour period at room temperature, and is then diluted with an equal volume of water and extracted three times with 300 cc. portions of ether. The combined ether extracts are washed with water, dried over anhydrous magnesium sulfate, and the ether is distilled off. The residue, comprising 1-(3',4'-dimethoxyphenyl)-2-propanone oxime, may be purified by fractional distillation in vacuo.

1-(3',4'-dimethoxyphenyl)-2-propanone oxime thus prepared boiled at about 165–175° C. at 0.6 mm. pressure. Analysis showed the presence of 7.23 percent of nitrogen, compared with the calculated amount of 6.69 percent.

A solution of 151 g. of 1-(3',4'-dimethoxyphenyl)-2-propanone oxime in 200 cc. of absolute ethanol is treated with 5 g. of Raney nickel catalyst and ammonia in an autoclave at about 25 atmospheres of pressure and at 75–100° C. The reduction is complete in about one-half hour and the reaction mixture is filtered and fractionated under reduced pressure to recover the α-methylhomoveratrylamine formed by the reduction.

α-Methylhomoveratrylamine thus prepared boiled at 163–165° C. at 18 mm. pressure.

A mixture of 39.0 g. (0.2 mol) of α-methylhomoveratrylamine and 42.0 g. (0.2 mol) of 3-methoxy-4-ethoxyphenylacetic acid is heated at 190–200° C. for one hour. The reaction mixture is poured into about 100 cc. of petroleum ether, whereupon crystals of N-(α-methylhomoveratryl) - 3 - methoxy - 4 - ethoxyphenylacetamide separate. The precipitate is filtered off, and recrystallized from 50 percent methanol-water.

N - (α - methylhomoveratryl) - 3 - methoxy - 4-ethoxyphenylacetamide thus prepared melted at about 135–136° C. Analysis showed the presence of 68.05 percent carbon and 7.62 percent of hydrogen compared with the calculated amount of 68.19 percent carbon and 7.54 percent hydrogen.

A solution of 50 g. of N-(α-methylhomoveratryl)-3-methoxy-4-ethoxyphenylacetamide, prepared as set out above, in 200 cc. of benzene, is treated with 8 cc. of phosphorus oxychloride. The mixture is refluxed for about three hours, cooled and then is shaken with a solution composed of 15 g. of sodium hydroxide dissolved in 60 cc. of water. The aqueous layer is removed, and the benzene solution is washed with water. The washed benzene solution is dried over anhydrous magnesium sulfate, filtered and evaporated to dryness. The low-melting solid residue is 6,7-dimethoxy-3-methyl-1-(3'-methoxy-4'-ethoxybenzyl)-dihydroisoquinoline base.

Fifty g. of 6,7-dimethoxy-3-methyl-1-(3'-methoxy-4'-ethoxybenzyl)-dihydroisoquinoline base are dissolved in 300 ml. of absolute ethanol and anhydrous hydrogen chloride is passed into the cooled solution until precipitation is completed. The slurry of the hydrochloride salt of the dihydroquinoline base is filtered, and the salt is recrystallized twice from hot ethanol to which ether has been added to the point of incipient crystallization.

6,7 - dimethoxy - 3 - methyl - 1 - (3' - methoxy - 4'-ethoxybenzyl)-dihydroisoquinoline hydrochloride thus prepared melted at about 206–208° C. Analysis showed the presence of 65.84 percent of carbon and 7.13 percent of hydrogen as compared with the calculated amounts of 65.09 percent of carbon and 6.95 percent of hydrogen.

Other salts of 6,7-dimethoxy-3-methyl-1-(3'-methoxy-4'-ethoxybenzyl)-dihydroisoquinoline can be prepared by the interreaction of stoichiometrically equivalent amounts of 6,7-dimethoxy-3-methyl-1-(3'-methoxy-4'-ethoxybenzyl)-dihydroisoquinoline and the selected acid in a common solvent. Thus, the addition of stoichiometrically equivalent amounts of phosphoric, sulfuric, acetic or nitric acid to a cold alcohol solution of 6,7-dimethoxy - 3 - methyl - 1 - (3' - methoxy - 4' - ethoxybenzyl)-dihydroisoquinoline, followed by removal of the alcohol by evaporation, results in the preparation of the phosphate, sulfate, acetate and nitrate salts of 6,7-dimethoxy - 3 - methyl - 1 - (3' - methoxy - 4' - ethoxybenzyl)-dihydroisoquinoline, respectively. Preferably, the process is conducted in the absence of air.

*Example 11*

Preparation of 6,7-dimethoxy-3-methyl-1-(3'-methoxy-4'-ethoxybenzyl)-isoquinoline.

To a solution of 50 g. of 6,7-dimethoxy-3-methyl-1-(4'-ethoxy-3'-methoxybenzyl)-dihydroisoquinoline base (prepared according to the method of Example 10) in 200 ml. of dry benzene are added 150 ml. of decalin, and the mixture is distilled until its temperature reaches 180° C. 1.5 g. of 5 percent palladium on carbon are then added. The mixture is stirred under reflux for about six hours to dehydrogenate the dihydroisoquinoline. On cooling, the reaction mixture is diluted with petroleum ether and the precipitated 6,7-dimethoxy-3-methyl-1-(3'-methoxy-4'-ethoxybenzyl)-isoquinoline is filtered off and recrystallized from dilute ethanol.

6,7 - dimethoxy - 3 - methyl - 1 - (3' - methoxy - 4' - ethoxybenzylisoquinoline thus prepared melted at 124–125° C. Analysis showed the presence of 71.68 percent carbon and 7.07 percent hydrogen as compared with the calculated amount of 71.91 percent carbon and 6.85 percent hydrogen.

Example 12

Preparation of 6,7-dimethoxy-3-methyl-1-(3'-methoxy-4'-ethoxybenzyl)-isoquinoline hydrochloride.

A solution of 38 g. of 6,7-dimethoxy-3-methyl-1-(4'-ethoxy-3'-methoxybenzyl)-isoquinoline base in 500 cc. of absolute ethanol is treated with slightly more than a stoichiometric amount of concentrated hydrochloric acid. The solution is diluted with 3 volumes of ether, whereupon an oily precipitate is formed, which slowly turns to a solid. The precipitate is filtered off, washed with ether, and redissolved in a mixture of 300 cc. of absolute ethanol and 6 cc. of water. The solution is filtered and 500 cc. of anhydrous ether are added, whereupon crystals begin to separate. The mixture is then chilled and permitted to stand until precipitation is completed. The crystalline precipitate, comprising 6,7-dimethoxy-3-methyl-1-(3'-methoxy-4'-ethoxybenzyl)-isoquinoline hydrochloride, is filtered off, washed with anhydrous ether and dried.

6,7 - dimethoxy - 3 - methyl - 1 - (3' - methoxy - 4'-ethoxybenzyl)-isoquinoline hydrochloride thus prepared melted at 196-208° C. Analysis showed the presence of 3.47 percent of nitrogen compared with the calculated amount of 3.47 percent.

Example 13

Preparation of 6,7-dimethoxy-3-methyl-1-(3'-methoxy-4'-isopropoxybenzyl)-isoquinoline.

N - (α - methylhomoveratryl) - 3 - methoxy - 4 - isopropoxyphenylacetamide is prepared as set out in Example 10 from equivalent quantities of α-methylhomoveratrylamine and 3-methoxy-4-isopropoxyphenylacetic acid.

N - (α - methylhomoveratryl) - 3 - methoxy - 4 - isopropoxyphenylacetamide thus prepared melted at 115–116° C. Analysis showed the presence of 68.77 percent of carbon and 7.67 percent of hydrogen as compared with the calculated amounts of 68.80 per cent of carbon and 7.78 percent of hydrogen.

A solution of 42 g. of N-(α-methylhomoveratryl)-3-methoxy-4-isopropoxyphenylacetamide in 200 cc. of benzene is treated with 8 cc. of phosphorus oxychloride. The resulting 6,7-dimethoxy-3-methyl-1-(3'-methoxy-4'-isopropoxybenzyl)-dihydroisoquinoline is recovered and is dehydrogenated with palladium, according to the procedure described in Example 1.

6,7 - dimethoxy - 3 - methyl - 1 - (3' - methoxy - 4' - isopropoxybenzyl)-isoquinoline thus prepared melted at 110–111° C. Analysis showed the presence of 72.21 percent carbon and 7.34 percent hydrogen, as compared with the calculated amounts of 72.41 percent carbon and 7.13 percent hydrogen.

Example 14

Preparation of 6,7-dimethoxy-3-methyl-1-(3'-methoxy-4'-isopropoxybenzyl)-isoquinoline hydrochloride.

A solution of 25 g. of 6,7-dimethoxy-3-methyl-1-(3'-methoxy-4'-isopropoxybenzyl)-isoquinoline base in 100 cc. of anhydrous ethanol is treated with 5 g. of dry hydrogen chloride. The reaction mixture is diluted with sufficient anhydrous ether to cause complete precipitation. The precipitate, comprising 6,7-dimethoxy-3-methyl-1-(3'-methoxy - 4' - isopropoxybenzyl) - isoquinoline hydrochloride, is filtered off and recrystallized from absolute ethanol containing a trace of water, by the addition of anhydrous ether.

6,7 - dimethoxy - 3 - methyl - 1 - (3' - methoxy - 4' - isopropoxybenzyl)-isoquinoline hydrochloride thus prepared melted at 206–208° C. Analysis showed the presence of 2.96 percent nitrogen as compared with the calculated amount of 3.18 percent nitrogen, based on the presence of one-half molecule of alcohol of crystallization for each molecule of the salt.

Example 15

Preparation of 6,7-dimethoxy-3-methyl-1-(3'-ethoxy-4'-methoxybenzyl)-isoquinoline hydrochloride.

N - (α - methylhomoveratryl) - 3 - ethoxy - 4 - methoxyphenylacetamide is prepared as set out in Example 10 from equivalent quantities of α-methylhomoveratrylamine and 3-ethoxy-4-methoxyphenylacetic acid.

N - (α - methylhomoveratryl) - 3 - ethoxy - 4 - methoxyphenylacetamide thus prepared melted at 101.5–102.5° C. Analysis showed the presence of 67.92 percent of carbon and 7.70 percent of hydrogen as compared with the calculated amounts of 68.18 percent of carbon and 7.54 percent of hydrogen.

A solution of 31.5 g. of N-(α-methylhomoveratryl)-3-ethoxy-4-methoxyphenylacetamide in 200 cc. of benzene is treated with 8 cc. of phosphorus oxychloride. The resulting 6,7-dimethoxy-3-methyl-1-(3'-ethoxy-4'-methoxybenzyl)-dihydroisoquinoline is recovered and is dehydrogenated with palladium according to the procedure of Example 1. The reaction mixture from the dehydrogenation is filtered and extracted three times with 100 cc. portions of 10 percent aqueous hydrochloric acid. The combined acid extracts are made alkaline by the addition of 10 percent aqueous sodium hydroxide solution, and the alkaline mixture is extracted three times with 200 cc. portions of ether. The combined ether extracts, containing the 6,7-dimethoxy-3-methyl-1-(3'-ethoxy-4'-methoxybenzyl)-isoquinoline formed in the dehydrogenation, are dried over anhydrous magnesium sulfate and then concentrated to a volume of about 300 cc. in vacuo. The resulting ether solution is treated with dry hydrogen chloride until precipitation is completed. The 6,7-dimethoxy - 3 - methyl - 1 - (3' - ethoxy - 4' - methoxybenzyl)-isoquinoline hydrochloride is filtered off and purified by recrystallization from ethanol-ether.

6,7 - dimethoxy - 3 - methyl - 1 - (3' - ethoxy - 4' - methoxybenzyl)-isoquinoline hydrochloride thus prepared melted at 180-184° C. Analysis showed the presence of 63.25 percent of carbon and 7.16 percent of hydrogen as compared with the calculated amounts of 63.36 percent of carbon and 6.94 percent of hydrogen, based on the hydrochloride hemihydrate-hemialcoholate.

Example 16

Preparation of 6,7-dimethoxy-3-methyl-1-(3'-methoxy-4'-ethoxybenzyl)-isoquinoline phosphate.

A solution of 5 g. of 6,7-dimethoxy-3-methyl-1-(4'-ethoxy-3'-methoxybenzyl)-isoquinoline in 100 cc. of ethanol is treated with a solution of 1.5 g. of phosphoric acid in 10 cc. of ethanol. 10 cc. of water are added to effect complete solution, and the reaction mixture is then cooled and ether is added until precipitation of the salt is complete. The precipitate of 6,7-dimethoxy-3-methyl - 1 - (3' - methoxy - 4' - ethoxybenzyl) - isoquinoline phosphate is filtered off and recrystallized from 85 percent ethanol by the addition of 2 volumes of ether.

I claim:

1. A member of the group consisting of a base represented by the formula

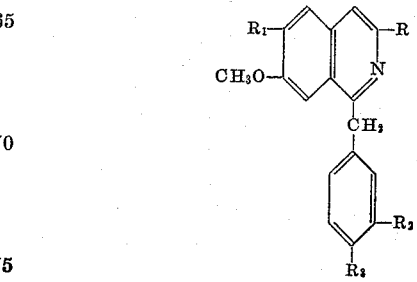

in which R is a member of the group consisting of hydrogen and methyl, $R_1$ is a member of the group consisting of methoxy and ethoxy and is methoxy when R is methyl, $R_2$ and $R_3$ are different members of the group consisting of alkoxy radicals having from 1 to 3 carbon atoms, only one of the radicals $R_2$ and $R_3$ having 1 carbon atom and $R_2$ and $R_3$ further being different radicals having from 1 to 2 carbon atoms when R is hydrogen; and the acid addition salts thereof.

2. An acid addition salt of 6,7-dimethoxy-3-methyl-1-(3'-methoxy-4'-ethoxybenzyl)-isoquinoline.

3. 6,7 - dimethoxy - 3 - methyl - 1 - (3' - methoxy - 4' - ethoxybenzyl) - isoquinoline phosphate.

4. 6,7 - dimethoxy - 3 - methyl - 1 - (3' - methoxy 4' - ethoxybenzyl)-isoquinoline.

5. 6,7 - dimethoxy - 1 - (3' - ethoxy - 4' - methoxybenzyl)-isoquinoline.

6. 6 - ethoxy - 7 - methoxy - 1 - (3' - ethoxy - 4' - methoxybenzyl)-isoquinoline.

7. 6,7 - dimethoxy - 1 - (3' - methoxy - 4' - ethoxybenzyl)-isoquinoline.

8. An acid addition salt of 6,7 - dimethoxy - 3 - methyl - (4' - ethoxy - 3' - methoxybenzyl) - dihydroisoquinoline.

9. 6,7 - dimethoxy - 3 - methyl - 1 - (4' - ethoxy - 3'-methoxybenzyl)-dihydroisoquinoline hydrochloride.

References Cited in the file of this patent

UNITED STATES PATENTS 1,941,647    Wolfes                 Jan. 2, 1934

OTHER REFERENCES

Bruckner et al.: J. Chem. Soc. (1946), pp. 885–90.